Oct. 4, 1960 M. ARDITI 2,955,262

GAS CELL FOR FREQUENCY SELECTIVE SYSTEM

Filed Feb. 21, 1958 2 Sheets-Sheet 1

Inventor
MAURICE ARDITI
By Philip M. Bolton
Attorney

Oct. 4, 1960 M. ARDITI 2,955,262

GAS CELL FOR FREQUENCY SELECTIVE SYSTEM

Filed Feb. 21, 1958 2 Sheets-Sheet 2

Inventor
MAURICE ARDITI
By Philip M. Bolton
Attorney

United States Patent Office 2,955,262

Patented Oct. 4, 1960

2,955,262

GAS CELL FOR FREQUENCY SELECTIVE SYSTEM

Maurice Arditi, Clifton, N.J., assignor to International Telephone and Telegraph Corporation, Nutley, N.J., a corporation of Maryland Filed Feb. 21, 1958, Ser. No. 716,686

11 Claims. (Cl. 331—3)

This invention relates to a gas cell and a method relating thereto, for use in a frequency selective system, particularly one using detection of microwave hyperfine transitions in alkali metal vapors, and its application, for example, to an atomic frequency standard.

It has been proposed to use the frequency selective atomic transitions in a gas cell as a control for an oscillator to provide a frequency standard. Devices of this type have been termed "Atomic Clocks."

In one possible form of a gas cell atomic clock, an oscillator induces a transition in a molecular or atomic state. This transition has a certain frequency sensitivity (resonance curve). By phase modulation of the oscillator, the derivative of the resonance curve (an S curve) can be obtained at the output of a phase detector. This S curve provides an error signal which can be fed back to lock the oscillator to the frequency of the atomic transition.

In such a system the requirements for a stable and accurate clock are as follows:

(*a*) The signal-to-noise (S/N) ratio of the detector should be as large as possible.

(*b*) The width of the resonance curve should be as narrow as possible.

(*c*) The center frequency $f_0$ should be nearly independent of external electric or magnetic fields, temperature variations, pressure, acceleration, etc.

(*d*) No system errors should be introduced by the automatic frequency control.

One atomic transition which quite nearly answers these specifications is the microwave hyperfine transition $$\Delta F=1\Delta m_F=0 m_F=0$$

at ground state in alkali metal vapors. This transition is based on the relative orientation of the spin of the valence electron as compared to the spin of the nucleus. This transition is independent of electric field because it is a magnetic dipole transition and is also relatively independent of magnetic field. It has been proposed to increase the sensitivity of the detection of this transition by using optical pumping and optical detection (see, for example, the copending application of M. Arditi—T. R. Carver 55-1, Serial No. 701,929, filed December 10, 1957, for "Frequency Selective Method and System").

It has also been proposed to use a buffer gas in the cell in which this transition is produced in order to:

(1) Reduce the Doppler width of the resonance curve; and (2) To make the optical pumping more efficient by delaying the capture of the alkali metal atoms on the walls of the cell container.

Certain difficulties are, however, introduced by the use of a buffer gas. In the first place, the center frequency is shifted and, secondly, this center frequency is now subject to change due to changes in the pressure and temperature of the cell. Since it is of considerable importance to use such a buffer gas, these difficulties have proven to be serious.

In certain cases, it may be desirable to provide a predetermined center frequency versus pressure characteristic. Thus, by controlling the pressure (for example through controlling the temperature) of the cell, one would be enabled to shift the center frequency in a predetermined manner or raise or lower it to a predetermined value.

An object of the present invention is the provision of an alkali metal vapor cell using buffer gases for use in a frequency selective system in which different buffer gases are mixed to provide a predetermined and/or selected center frequency versus pressure characteristic.

Another object of the present invention is the provision of an alkali metal vapor cell using a mixture of different buffer gases to select a given center frequency with a given pressure.

Another object of the present invention is the provision of a method for controlling and/or determining the center frequency versus pressure characteristic of an alkali metal vapor cell in a frequency selective system by using a plurality of different buffer gases.

A further object of the present invention is the provision of an alkali metal vapor cell using a plurality of buffer gases, for use in a frequency selective system, which is relatively insensitive to changes of pressure and temperature.

Another object of the present invention is the provision of an atomic clock employing a cell of the type mentioned in the above paragraph.

It has been found that, depending upon the atomic weight of the buffer gas, there is a tendency for the center frequency to be shifted upwardly or downwardly with increases of pressure, with the lighter gases shifting the frequency upward, and the heavier gases shifting the frequency downward. In accordance with the main feature of the present invention, it is proposed to employ two or more buffer gases to control this shift. For an atomic clock which is to be independent of temperature and pressure changes, it is proposed to use a plurality of gases, at least one of which tends to increase the frequency, that is, a lighter atomic weight gas, and another of which tends to decrease the frequency, such as a heavier atomic weight gas with increases of pressure, as will be pointed out in detail hereinafter, to thereby maintain the center frequency relatively constant, despite changes in pressure, the pressure being, of course, a function of temperature. This also provides for temperature stability.

Other and further objects of the present invention will become apparent, and the foregoing will be better understood with reference to the following description of embodiments thereof, reference being had to the drawings, in which.

As has been pointed out hereinbefore, the center frequency of atomic hyperfine ground transitions varies with the pressure of the buffer gas employed. This variation is shown qualitatively in Figs. 1 and 2. With respect to these figures, it is first of all to be pointed out that the values shown are only approximate since a small correction factor has to be applied to take care of secondary effects, like multiple collisions between different gases and the vapor, etc. With full appreciation of this limitation, however, the figures do serve to show, from experimentally obtained relations, the significance and application of the present invention.

Figure 1:
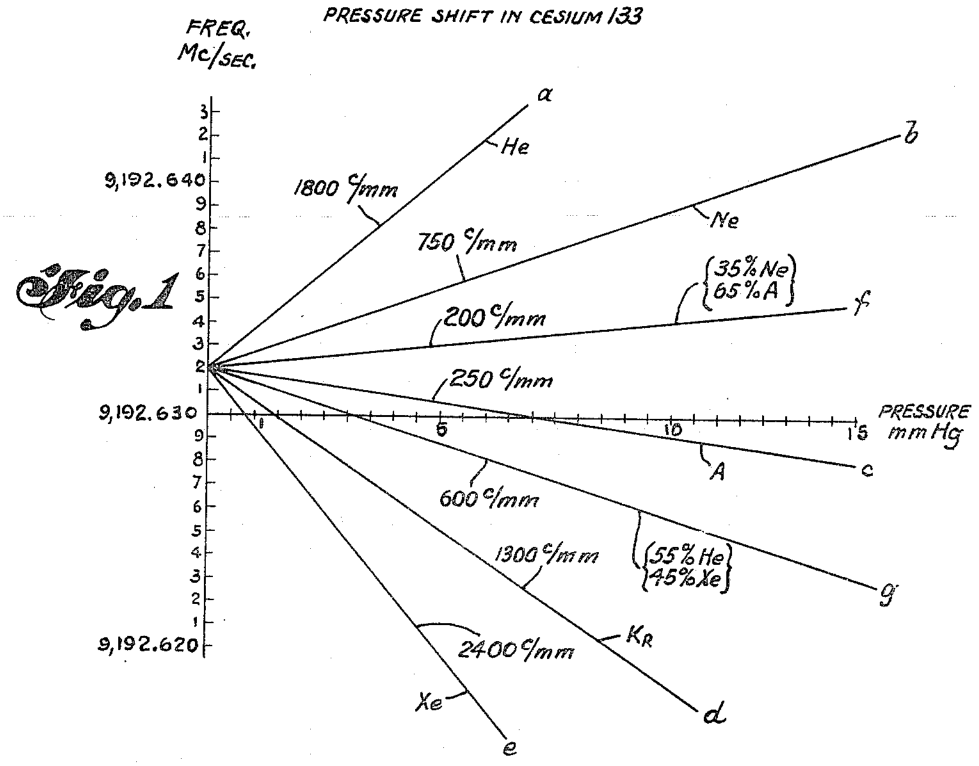
Fig. 1 is a graph in which center frequency in megacycles per second is plotted against pressure in millimeters of Hg for a hyperfine ground atomic transition in cesium vapor using different buffer gases, separately and in mixtures.

Referring now particularly to Fig. 1, in a cell employing cesium vapor in which the microwave transitions induced were $\Delta F=1$, from $F=4m_F=0$ to $F=3m_F=0$ and various buffer gases were employed in the cell in which the transitions were induced. Curve *a* indicates that with helium as a buffer gas as the pressure increases the center frequency increases at the rate of approximately 1800 c.p.s. per millimeter of Hg of pressure. It will be noted that for both helium and neon, the frequency increases with increases of pressure, but for argon (see curve *c*) and gases of heavier atomic weight, such as krypton and xenon, the frequency decreases as the pressure increases. The approximate rates at which these occur are indicated on the graph of Fig. 1. In addition to the gases mentioned in Fig. 1, that is, helium, neon, argon, krypton, and xenon, it is also known that hydrogen and nitrogen, which are both non-magnetic gases, may also be employed as buffer gases and that these buffer gases also cause the center frequency to vary with changes in pressure in a manner similar to the gases already pointed out and that their curves would fall in Fig. 1 among the curves shown in a position corresponding to their atomic weights with both hydrogen and nitrogen raising the center frequency with increases of pressure. It is to be noted, in addition to being non-magnetic, all of the buffer gases do not chemically react with each other or any of the alkali metal vapors.

It has also been observed that other gases, including organic gases, may be employed as buffer gases. Thus, the foregoing enumeration of specific gases is to be considered as merely illustrative and not at all complete, and it is to be understood that the present invention applies to other buffer gases as well as those enumerated. As used herein, then, a buffer gas is a gas which is non-magnetic at the operating temperatures, is chemically non-reactive with the alkali metal vapor and other gases in the cell as well as the walls thereof at the operating temperatures, and serves to impede the direct movement of the vapor atoms to the cell walls.

In accordance with the present invention, a method is provided for mixing different buffer gases so as to provide any predetermined or selected center frequency versus pressure characteristic. Thus, for example, in a cesium cell employing a mixture of neon and argon with their partial pressures being 35 percent, neon 65 percent, a characteristic such as indicated by curve *b* was obtained. It will be noted that this is a flatter characteristic than given by neon (curve *b*) or argon (curve *a*) taken alone and that the variation with pressure of this mixture was approximately 200 cycles per millimeter as opposed to the 750 cycles of neon and the 250 cycles of argon. While theoeretically the resultant curve should have been absolutely flat, due to a number of parameters that can be only empirically determined, as pointed out before, the curve had a slight slope. This is correctable by a slight change in the mixture, such as, for example, by using 30 percent neon and 70 percent argon. In another test using helium and xenon in a mixture of 55 percent helium and 45 percent xenon (partial pressures), results indicated by curve *g* were obtained with the same transition in a cesium vapor cell. In the case of this mixture, there is a decrease of approximately 600 c.p.s. for an increase of one milligram of pressure of Hg. This curve is much flatter than the curves of the individual gases of the mixture as can be seen by comparing the 600-cycle rate of curve *g* with the 1800-cycle rate of curve *a* and the 2400-cycle rate of curve *e*. Here again also the curve is not flat and in order to overcome the effects of pressure in changing the center frequency, it is necesary to make an adjustment for other parameters involved and a suitable mixture in the given example would be approximately 60 percent helium and 40 percent xenon.

Figure 2:
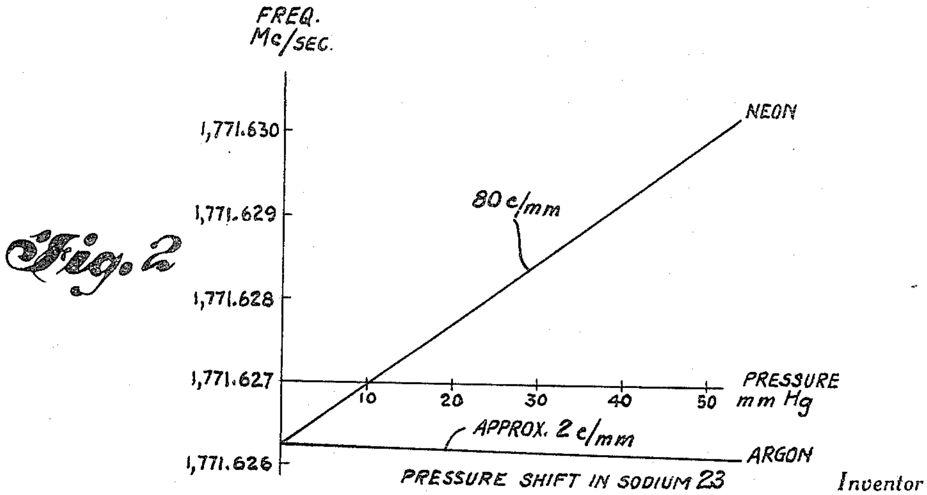
Fig. 2 is a similar graph for sodium vapor with two different buffer gases.

While Fig. 1 refers to the transitions in the cesium vapor, similar effects of buffer gases are formed with other alkali metal vapors; for example, Fig. 2 represents the changes in the center frequency of the $$\Delta F=1\Delta m_F=0m_F=0$$

transition in sodium 23 vapor with changes in pressure for two buffer gases, neon and argon. By mixing a very small percentage of neon with argon, the slight droop in the center of frequency versus pressure characteristic of argon as a buffer gas is corrected to produce a substantially flat characteristic. In general, to obtain a flat characteristic, the gases are added so that their partial pressures are approximately an inverse proportion to the ratio of their rates of change with pressure with one of the gases having an atomic weight of argon or heavier and another of the gases having an atomic weight less than argon. Thus, one of the gases produces an upward frequency change, as in Fig. 1 shown in curves *a* or *b*, and one of the gases produces a downward frequency change as shown in Fig. 1 in curves *c*, *d*, and *e*, with increases of pressure.

A characteristic of some importance of the different buffer gases is that gases having the steepest slopes (of frequency shift versus pressure) also produce the weakest output signal from the phase detector. Thus, generally, in order to obtain a larger signal, it is preferred to mix two buffer gases of flatter slope to achieve a flat slope.

While we have referred to a mixture of two buffer gases, it is obvious that three or more gases may be used in the mixture. Thus, for example, if a mixture of two buffer gases of flatter slope does not give the expected flat slope, for reasons pointed out hereinbefore, a slight addition of a buffer gas of steep slope will make the correction.

An alkali metal vapor cell using a mixture of buffer gases as explained heretofore may be used in an atomic clock. One specific arrangement of such a clock is illustrated in Fig. 1.

Figure 3:
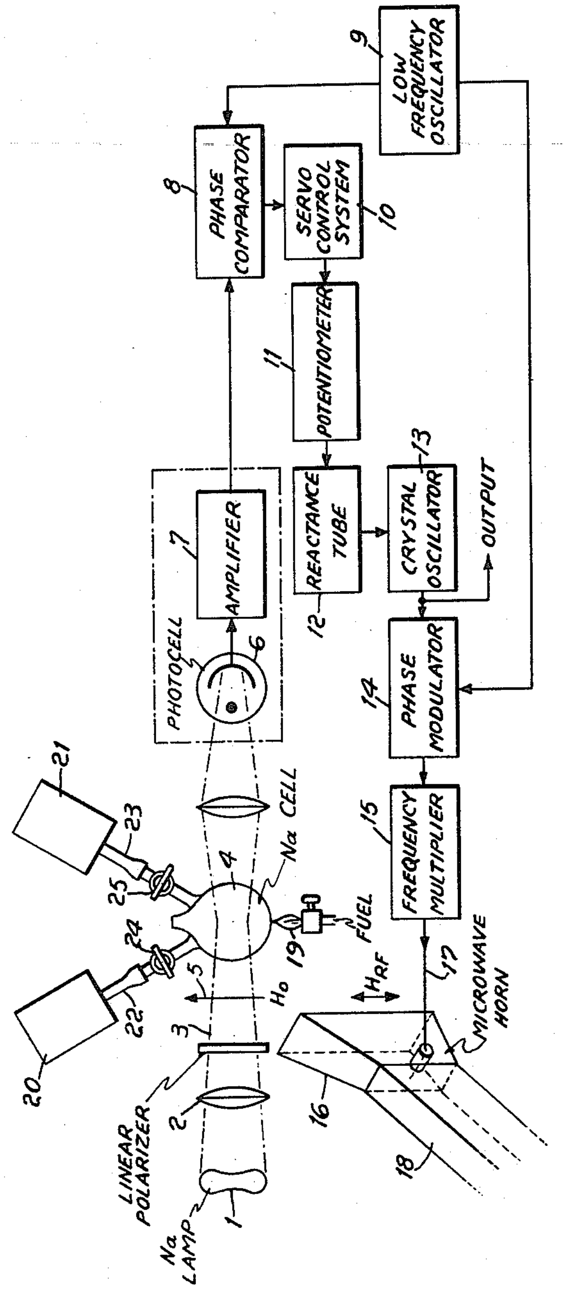
Fig. 3 is a schematic block diagram of an atomic clock arrangement using a cell employing a mixture of buffer gases in accordance with the present invention.

Referring now to Fig. 3, a steady beam of linearly polarized resonance radiation is obtained from a standard cesium lamp 1, preferably running on steady direct current, whose light output is passed through a linear polarizer 2. The linear polarizer can be, for example, a single sheet producing linear polarization. This linearly polarized cesium resonance radiation beam 3 is passed through a gas cell 4 containing vaporized cesium and a mixture of buffer gases, as more fully described hereinabove to produce a flat center frequency pressure characteristic. A static magnetic field 5 whose magnetic lines of force are parallel to the electric vector of the linearly polarized light and are perpendicular to the direction of propagation of the beam 3 is provided passing through the cell 4. In view of stray magnetic fields, including the earth's magnetic field, which might interfere with the desired effect of the optical pumping, it is desirable to magnetically shield the gas cell. Any suitable source of such a static magnetic field may be employed. The light passing through cell 4 in the forward direction defined by the direction of the beam 3, is directed onto a photocell 6 whose output is in turn amplified in amplifier 7 and applied to a phase comparator 8 which may be in the form of a synchronous detector. In the phase comparator 8, the output of amplifier 7 is compared with a reference signal from a low frequency oscillator 9, and its output, whose amplitude and polarity vary in accordance with the difference between the center frequency of the atomic transition and the frequency of the microwave energy applied to the cell, as will be pointed out below, is applied to a servo control system 10 which rotates a potentiometer 11 applying the voltage to the reactance tube 12 which, in turn, causes relatively small changes in a crystal oscillator 13 to vary its output frequency. The output of crystal oscillator 13 is passed through a phase modulator 14, to which phase modulator a signal from the low frequency oscillator 9 is also applied to thereby phase modulate the output of crystal oscillator 13. This resultant phase modulated signal is applied to frequency multiplier 15 where it is multiplied up to the microwave frequency range, as will be more specifically pointed out hereinafter, to provide a frequency modulated microwave signal. This frequency modulated microwave signal is then applied to a microwave horn 16 via a suitable waveguiding means, such as a coaxial line 17, and a radiating probe 18. The horn radiates the resultant microwave energy and directs the radiation through the cesium cell 4. The probe 18 is so oriented in the horn 16 that the resultant magnetic field of the radiated wave, as it passes through the cesium cell 4, is parallel to the static magnetic field 5.

The cesium cell 4 is prepared by evacuating a glass bulb, causing cesium to enter the bulb by distillation, then filling the cell with a mixture of buffer gases, for example, those taken from the class consisting of hydrogen, helium, nitrogen, neon, argon, krypton, and xenon. If, as in the usual atomic clock, it is desired to have a flat center frequency versus pressure response, then the two gases could be, for example, neon and argon (with approximate partial pressures of 30 percent and 70 percent, respectively) or helium and xenon (with approximate partial pressures of 60 percent and 40 percent, respectively) or any combination of the gases of the above-mentioned class of gases with the mixture including one of these gases having a lower atomic weight than argon and another of these gases being argon or a gas of higher atomic weight. It will also be seen that if other than flat characteristics are desired, or if it is desired to vary the center frequency by controlling or selecting the pressure and by controlling and/or selecting the buffer gases forming the mixture and their partial pressures, the frequency versus pressure characteristic can be changed, or the center frequency can be changed. For this purpose it is shown by way of illustration that the cell 4 is connected to two sources of different buffer gases 20 and 21 through lines 22 and 23, respectively, having control 24 and 25 which may be opened and closed to allow different amounts of the buffer gases into the mixture. By controlling the temperature of the cell from source 19, such as by raising or lowering the flame, the pressure can be changed to control the center frequency.

In operation, the cell is preferably heated by some means, such as a flame, which will not interfere with the magnetic fields, to a temperature preferably between 15° C. to 30° C. in the case of cesium. Other alkali vapors could be used in place of cesium, such as rubidium which would be heated to around 40° C. and sodium which would be heated to around 120° C. to 130° C. The operating temperatures for whatever alkali vapors are employed should be high enough to allow enough atoms to be excited to obtain a good signal output, but not so high as to produce disorientation of the magnetic momenta due to collisions between atoms. The buffer gases serve to reduce the Doppler effect and also to aid the optical pumping. There is an optimum buffer gas pressure for optimum optical pumping.

Preferably because of conflict in the requirements for optimum optical pumping efficiency and for a reduction in the Doppler effect, it is preferred to use a buffer gas pressure of about 1 mm. of Hg or higher, but usually not exceeding 5 mm. of Hg pressure. However, where it is desired to increase the relaxation time of the atom in case very sharp resonant transitions are desired, higher pressures may be employed. For example, pressures of buffer gases as high as 3 cm. of Hg pressure may be used.

An understanding of the operation of the foregoing system will be clear from the following considerations. The ground energy levels of cesium are split into two states designated at $F=4$, $F=3$, depending upon the direction of the electronic spin. In the presence of a magnetic field they are subject to the usual Zeeman splitting into $2F+1$ components having $2F+1$ possible values ranging from $+F$ to $-F$ and are represented by magnetic quantum number $m_F$. In a weak magnetic field transitions can occur in accordance with the selection rules $\Delta m_F=\pm 1$ or $\Delta m_F=0$. The transitions for which $\Delta F=1$ correspond to frequencies in the region of 9192 mc./s. The preferred transition is the transition between level $F=4 m_F=0$ and $F=3 m_F=0$. The excitation by the linearly polarized light produces in cell 4 an increase of the population difference between the $F=4 m_F=0$, $F=3 m_F=0$ levels. The desired transition is brought about by adjusting the frequency of the microwave energy radiated from horn 16 to match the transition frequency $f_0$. In the case of cesium, $f_0=(9{,}192631+0.000426H^2)10^6$ sec.$^{-1}$. It is to be noted that the energy levels involved in this transition are very slightly affected by the magnetic field so that in the case of transitions between these levels the change of the frequency is very slight. For a field of 0.1 oersted $f_0-9{,}192631=4$ cycles per second. The adjustment of the microwave energy producing the transition may be automatically controlled by any suitable AFC system, such as the one pointed out hereinbefore. As the microwave frequency applied to the cell is varied on either side of the resonance transition frequency $f_0$, the light absorption varies according to a characteristic absorption curve. This curve has the same shape as a Lorentzian resonance curve. The low frequency oscillator 9 is used to vary the microwave frequency back and forth over a small portion of this curve about a mean frequency fixed by the microwave oscillator. If this variation occurs around a mean frequency which is equal to the transition resonance frequency, the output will be a minimum. If the mean frequency is on either side of $f_0$, an output will be obtained from photocell 6 in the form of a low frequency wave. When the mean frequency is on one side of $f_0$, the phase of this low frequency wave will be 180° out of phase with the low frequency wave produced when the mean frequency is on the other side of $f_0$. In the phase comparator 8, the low frequency wave is compared with the reference low frequency wave from oscillator 9. A D.C. error signal is obtained whose polarity depends on the relative phases of the compared low frequency waves. When the mean frequency is on one side of the resonance transition frequency $f_0$, positive error voltages are obtained, and that when the mean frequency is on the other side of the $f_0$ resonance frequency, negative voltages are obtained; when the mean frequency matches the resonance frequency, no error signal results. It will be seen that, when properly applied, these bipolar error signals will drive crystal oscillator 13 in a direction to cause the microwave energy radiated from horn 16 to be equal to the resonance transition frequency $f_0$. Of the many ways in which this control may be obtained, the one shown only by way of example in Fig. 1 consists of a servo control system, the error signal being amplified in this system in the servo amplifier and used to drive a servo motor. The servo motor, in turn, drives potentiometer 11 controlling the voltage applied to the reactance tube 12 which, in conventional fashion, may be used to control a relatively stable crystal oscillator 13 to make slight variations in the frequency output thereof. This frequency is then multiplied and provides the mean frequency of the microwaves radiated in horn 16. It will be obvious, of course, that numerous other techniques for applying the error signals to control the means frequency may be employed.

The foregoing specific description of an atomic clock has most specifically referred to one transition of the ground state in the case of cesium. Other transitions in the ground state of cesium may be used instead, depending upon the frequency desired and on the particular arrangement; furthermore, instead of cesium, these transitions in other alkali metal vapors may be employed as is well known with their frequency selective characteristics. For example, sodium and rubidium, as well as cesium, have been widely used for this purpose. The effect of the mixture of buffer gases with the different alkali metal vapors is quite similar to what has been described before in varying the frequency versus pressure characteritics according to the different mixtures of buffer gases and quantities employed. The slope of the center frequency versus pressure characteristic of different mixtures of buffer gases is not, however, uniform for the different alkali metal vapors. This, however, does not change the basic principles hereinbefore enunciated and covered by the accompanying claims.

In the specific example mentioned hereinabove, reference was made to use of linearly polarized light for exciting the cell. The same effect of frequency pressure shift has also been observed using both circularly polarized light and unpolarized light.

While I have described above the principles of my invention in connection with specific apparatus, it is to be clearly understood that this description is made only by way of example and not as a limitation to the scope of my invention as set forth in the objects thereof and in the accompanying claims.

I claim:

1. A cell for use in a frequency selective system comprising an envelope containing an alkali metal vapor and a mixture of a plurality of gases of different atomic weights, one of said gases increasing the center frequency of hyperfine ground atomic transitions of the vapor with increases of pressure, and another of aid gases decreasing said frequency with increases of pressure, said gases being mixed to produce a predetermined relation between the center frequency and pressure.

2. A cell according to claim 1, wherein one of said gases has an atomic weight equal to or greater than argon, and another has an atomic weight less than argon.

3. A cell for use in a frequency selective system comprising an envelope containing an alkali metal vapor and a mixture of a plurality of gases of different atomic weights, one of said gases producing an increase in the center frequency of the hyperfine ground atomic transitions of the vapor at a given rate with respect to increases of pressure and another decreasing said center frequency at a second rate with respect to increases of said pressure, said gases being mixed with their partial pressures approximately in inverse proportion to the ratio of their rates.

4. A system for stabilizing a microwave generator at an atomic resonance frequency comprising a cell containing an alkali metal vapor and a mixture of a plurality of non-magnetic gases taken from the class consisting of hydrogen, helium, nitrogen, neon, argon, krypton, and xenon combined in proportion to produce an approximately fixed center frequency of the hyperfine ground atomic transitions of the vapor with changes in pressure therein, with at least one of said gases tending to produce an increase, and another of said gases tending to produce a decrease in said center frequency with increases in pressure, means for exciting said vapor in the presence of a static magnetic field to produce an increase of population at a given hyperfine ground energy level, means for simultaneously exciting said vapor to produce microwave hyperfine transitions therein at ground energy level, one of said exciting means including a microwave generator, means for detecting the transitions within said cell and automatic frequency control means coupled to said detecting means for controlling the frequency of said microwave generator.

5. A system for stabilizing a microwave generator at an atomic resonance frequency comprising a cell containing an alkali metal vapor and a mixture of a plurality of non-magnetic gases taken from the class consisting of hydrogen, helium, nitrogen, neon, argon, krypton, and xenon combined in proportion to produce an approximately fixed center frequency of the hyperfine ground atomic transitions of the vapor with changes in pressure therein with at least one of said gases tending to produce an increase, and another of said gases tending to produce a decrease in said center frequency with increases in pressure, a source of light directed into said cell, a microwave generator, means coupled to said generator for radiating microwave energy into said cell, detection means associated with said cell for detecting the microwave transitions therewithin, and automatic frequency control means coupled to said detection means for controlling the frequency of said microwave generator.

6. A system according to claim 5, wherein said detection means comprises photosensitive means positioned to receive light emitted from a given area of said cell.

7. A cell according to claim 1, wherein said vapor is cesium, and said mixture consists essentially of neon and argon.

8. A cell according to claim 7, wherein the partial pressures of said mixture consists of neon, approximately 30 percent, and argon, approximately 70 percent.

9. A cell according to claim 1, wherein said vapor is cesium, and said mixture consists essentially of helium and xenon.

10. A cesium cell according to claim 9, wherein in said mixture helium has a partial pressure of approximately 60 percent, and xenon has a partial pressure of approximately 40 percent.

11. A cell according to claim 1, wherein said vapor is sodium, and said mixture consists essentially of neon and argon.

References Cited in the file of this patent

UNITED STATES PATENTS 2,836,722 Dicke et al. ............ May 27, 1958
2,884,524 Dicke ................ Apr. 28, 1959

OTHER REFERENCES

"Spin Resonance of Free Electrons Polarized by Exchange Collisions," by Dehmelt in Physical Review, vol. 109, No. 2, Jan. 15, 1958, pages 381–385.